United States Patent [19]

Veré et al.

[11] Patent Number: 4,680,920
[45] Date of Patent: Jul. 21, 1987

[54] DEVICE FOR MOVING NUCLEAR FUEL ELEMENT SHEATHS AT A FIXED FILLING STATION

[75] Inventors: Bernard Veré, Brie et Angonnes - Eybens; Paul Mathevon, Bollene, both of France

[73] Assignee: Societe Cogema, Framatome et Uranium Pechiney, Villacoublay, France

[21] Appl. No.: 687,228

[22] Filed: Dec. 28, 1984

[30] Foreign Application Priority Data

Dec. 30, 1983 [FR] France .................................. 83 21125

[51] Int. Cl.⁴ .............................................. B65B 1/08
[52] U.S. Cl. ........................................ 53/525; 53/251; 198/774
[58] Field of Search .................. 53/244, 247, 249, 250, 53/251, 525, 502; 141/164, 165, 171, 176; 198/504, 505, 774; 414/736, 750, 751

[56] References Cited

U.S. PATENT DOCUMENTS

| | | | |
|---|---|---|---|
| 1,775,121 | 9/1930 | Einfeldt | 198/774 |
| 2,567,488 | 9/1951 | Lee | 198/774 |
| 3,491,804 | 1/1970 | Nillas | 141/164 |
| 3,530,646 | 9/1970 | Amada et al. | 53/250 |
| 3,815,726 | 6/1974 | Klein | 198/774 |
| 4,172,517 | 10/1979 | Kobayasi | 198/774 |
| 4,505,373 | 3/1985 | Thomas | 198/504 |

FOREIGN PATENT DOCUMENTS

| | | | |
|---|---|---|---|
| 1941103 | 2/1970 | Fed. Rep. of Germany | 198/774 |
| 2257130 | 8/1975 | France . | |

*Primary Examiner*—John Sipos
*Assistant Examiner*—Donald R. Studebaker

[57] ABSTRACT

A device is provided for transferring nuclear fuel element sheaths to a fixed pellet filling station. This device comprises a sheath transfer assembly. This latter comprises a first transporter for taking as a whole a layer of several sheaths placed on the laying rack of the first means associated with the first transporter and intended for changing the spacing pitch of the sheaths in the layer and for presenting the layer at the position for simultaneous filling of several sheaths by the vibrating table machine (50) for inserting fuel pellets, second pitch change means for bringing the sheaths back to the original pitch, a transporter cooperating with a second pitch change means for bringing the layer of sheaths as a whole onto a take up rack and means for the automatic synchronized control of the components of the assembly ensuring the movements of the sheaths always in the same direction.

6 Claims, 10 Drawing Figures

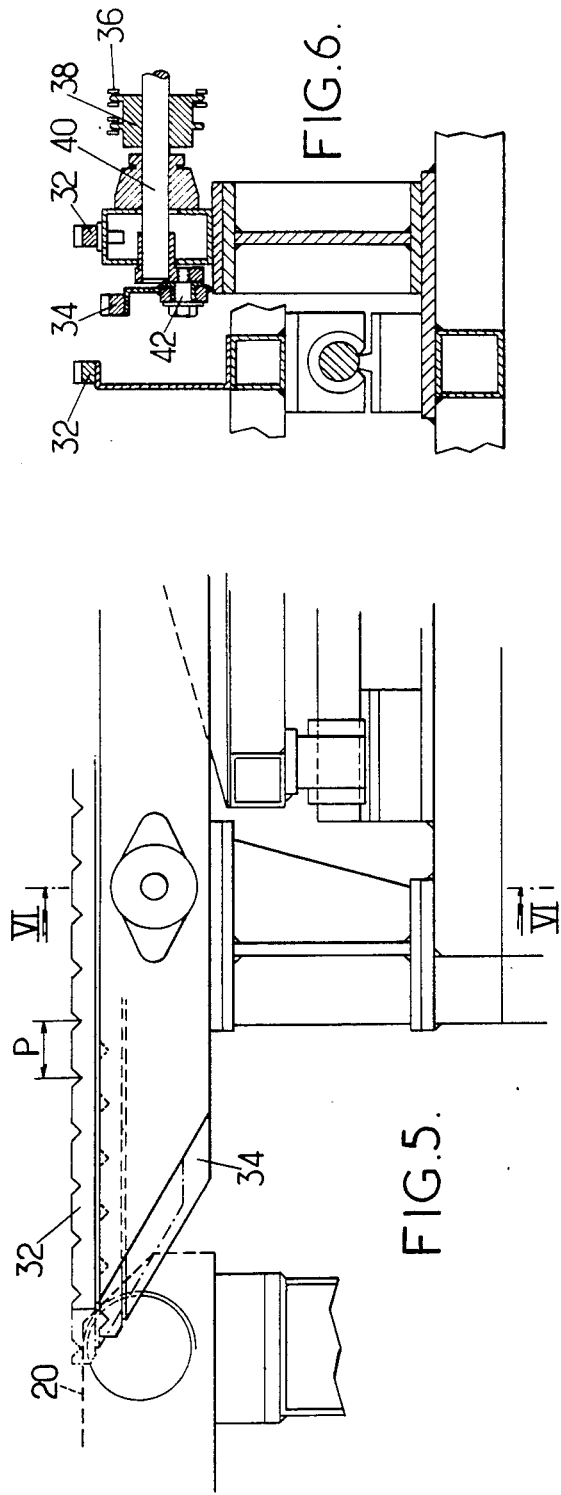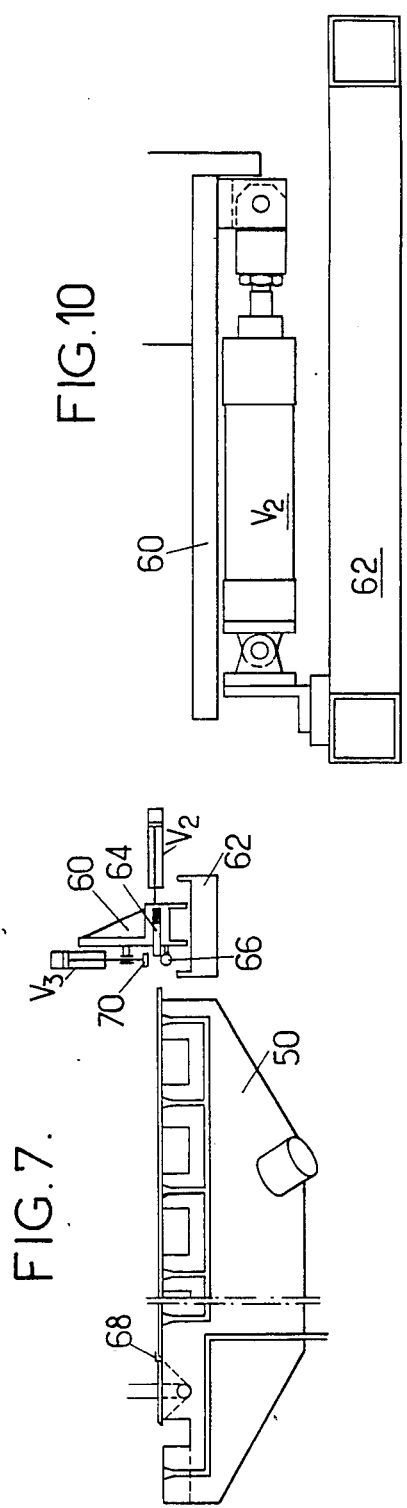

DEVICE FOR MOVING NUCLEAR FUEL ELEMENT SHEATHS AT A FIXED FILLING STATION

BACKGROUND AND SUMMARY OF THE INVENTION

The invention relates to a device for moving sheaths of nuclear fuel elements of the type comprising a stack of fuel pellets in the sheath at a filling station where a plurality of operations are carried out in succession.

Apparatuses for filling nuclear fuel element sheaths are already known. An apparatus described in French Pat. No. 2,257,130 comprises a vibrating table which causes pellets to enter through one end of a sheath closed at the other end and along the sheath.

It is an object of the invention to provide a device which is adapted to receive a plurality of sheaths, to bring them automatically to locations where successive operations take place and to place the sheaths on a rack after they have been loaded with pellets, for removal and transport to an other station. It is a more specific object to provide a device which is adapted to reduce the overall time which is necessary to fill a predetermined number of sheaths by carrying out different operations on successive sheaths at the same time. It is a more specific object to provide an apparatus in which the filled sheaths are finally arranged as a layer which may be lifted by the same machine which was previously used to place the empty sheaths on a laying rack.

For that purpose, there is provided a device comprising a first station for storage of empty sheaths as a horizontal layer of a plurality of empty sheaths in spaced relation to each other with a predetermined mutual spacing; a second station for storage of filled sheaths as a horizontal layer of a plurality of filled sheaths; sheath-loading means located between said first and second stations on a transfer path of said sheaths along a predetermined direction; first conveyor means for simultaneously engaging said plurality of empty sheaths and moving them as a whole toward said loading means; first pitch change means associated with said first conveyor means for repeatedly bringing part of the plurality of sheaths to a loading location confronting said sheath-loading means with a spacing which is different from said predetermined mutual spacing, for simultaneous filling of the sheaths by means already known; second pitch change means for repeatedly removing said part of the plurality of sheaths from said loading location and bringing them back to said predetermined mutual spacing; second conveyor means associated with said second pitch change means for moving said plurality of sheaths from said second pitch change means to said second station; and control means for synchronized actuation of said means.

It will be appreciated that all movements of the sheaths take place in the same, typically horizontal, direction. The pitch changing means will typically comprise "pilgrim step" conveyors. The pitch changing means will be constructed and arranged for each operation to take place with an appropriate spacing between adjacent sheaths, while the first and second stations, which may consist of laying and pick up racks, respectively, may be dimensioned for the surface required for storing the layer to be the minimum compatible with engagement by lifting means. The pitch changing means may each comprise two units, one for enlarging the mutual spacing and authorizing such operations as weighing or cleaning, and one for narrowing that spacing.

The sheath-loading means will typically include a vibrating table associated with retractable indexing means for inserting the open end of the sheath to be loaded acurately in indexing noses and then for maintaining them during filling for a description of the way sheaths are typically filled by the vibrating table, reference may be made to French No. 2 257 130 already mentioned.

The invention will be better understood from the following description of a particular embodiment of the invention, given by way of example. The description refers to the accompanying drawings.

SHORT DESCRIPTION OF THE DRAWINGS

FIG. 5 is an enlarged side view of that fraction of unit 2 of the assembly which is contained in the frame V of FIG. 1;

FIG. 6 is a section along line VI—VI of FIG. 5;

FIG. 7 is a general diagram of the retractable unit for indexing and de-indexing the transfer assembly as seen from the right of FIG. 1;

Figure 8:
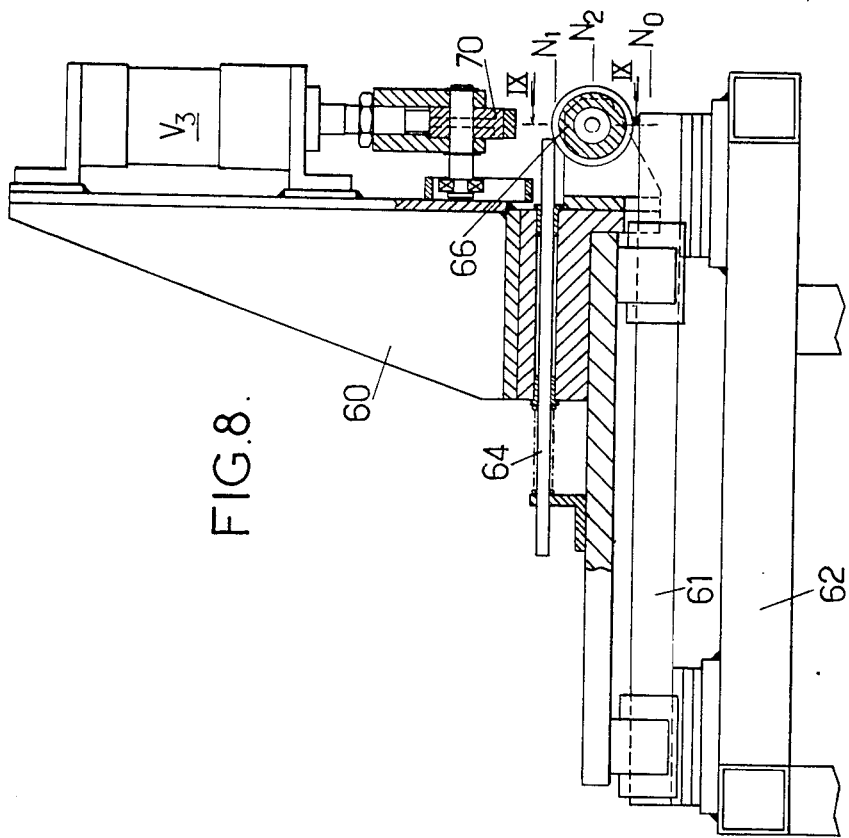
Figure 9:
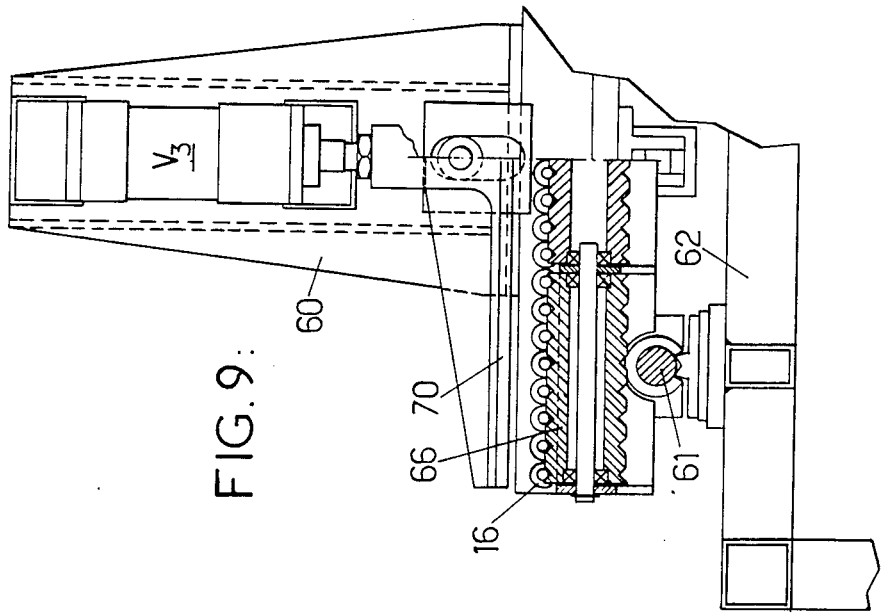

FIG. 8, a detail of FIG. 7, shows on an enlarged scale and in partial section a movable assembly of the indexing unit;

FIG. 9 is a view of the mobile assembly from the right hand side of FIG. 8, in partial section along line IX-—IX;

FIG. 10 is a detailed view in the same direction as FIG. 8, showing an actuating cylinder placed in the plane of symmetry of the mobile assembly.

DETAILED DESCRIPTION OF A PREFERRED EMBODIMENT

Figure 1:
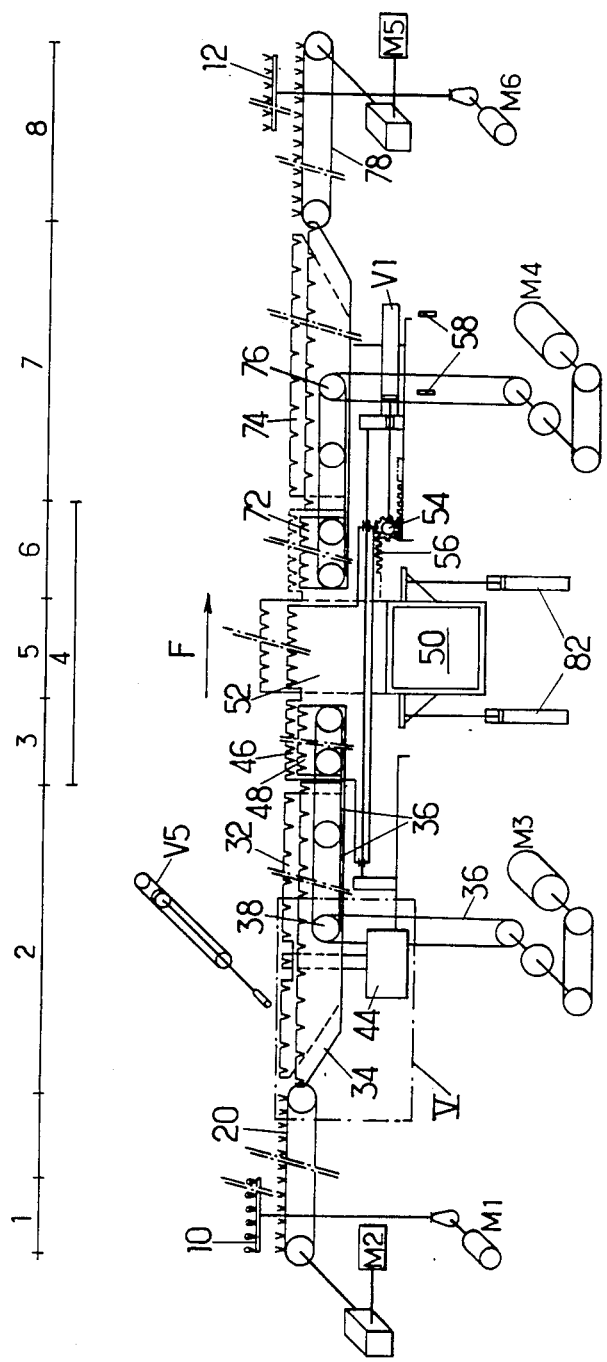
FIG. 1 is a diagrammatic side view of different units of a transfer device according to the invention.

The device for transfer at a fixed filling station which will now be described is particularly adapted for use in an apparatus of the kind disclosed in French Patent Application No. 83 21126, although it may be adapted to other apparatuses. Referring to FIG. 1, the device has a laying rack 10, which constitutes a first storage station, a pick up rack 12 constituting a second storage station and a transfer assembly for moving a plurality of sheaths located on rack 10 with a predetermined mutual spacing to the pick up rack 12 adapted to receive the sheaths with the same mutual spacing. A handling machine (not shown) which may be of the type disclosed in French Patent Application No. 83 21126 may be provided to lay a plurality of sheaths (twenty-four in number for instance) on rack 10 and to engage and lift the same plurality of sheaths from rack 12, after they have been filled. The transfer assembly is arranged to bring the sheaths into the different positions where the required successive operations take place before they are transferred to the take up rack 12.

The transfer assembly may be regarded as integrating several units operating in sequence on a same sheath, placed in the zones indicated by numerals 1 to 7 in FIG. 1 and fulfilling the following functions:

Unit 1: lateral transfer from the removal rack 10,
Unit 2: first change of spacing pitch for reading and weighing,
Unit 3: second change of spacing pitch for obtaining the pitch at which the vibrating loading table operates,
Unit 4: supply of sheaths for the vibrating table and removal,
Unit 5: indexing and de-indexing
Unit 6: third change of spacing pitch for cleaning the sheaths,
Unit 7: fourth change of pitch for putting back to the same pitch as the removal rack,
Unit 8: lateral transfer to the take up rack 12.

Units 7 and 8 have a construction which is practically symmetrical to that of units 2 and 1 and will therefore not be described in detail.

Figure 2:
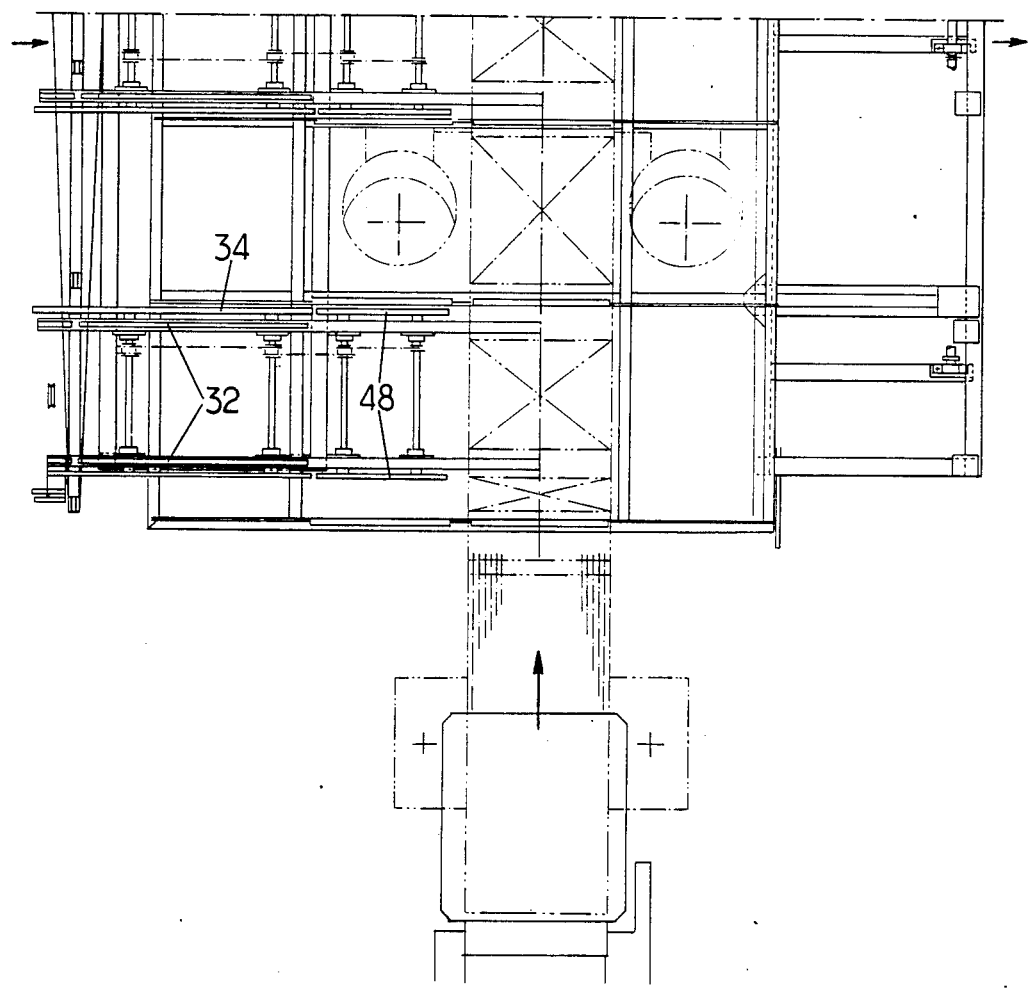
FIG. 2 is a top view of part of the assembly of FIG. 1.
Figure 3:
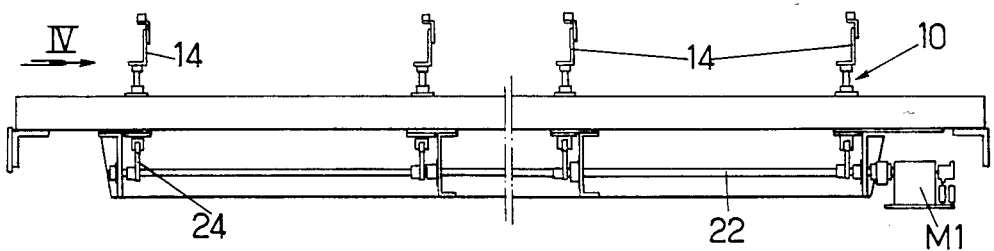
FIG. 3 is a view of the laying rack of the transfer assembly of FIG. 1, as seen from the left.
Figure 4:
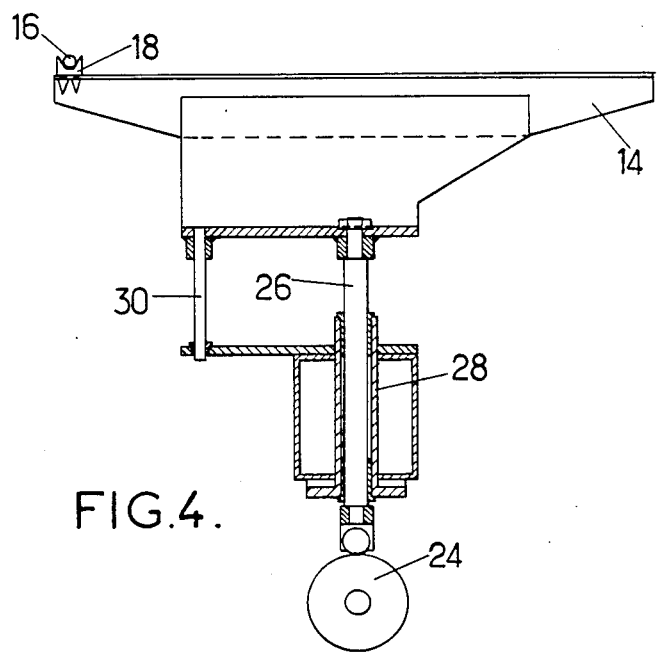
FIG. 4 is an enlarged view of one of the plates of the rack and of the raising and lowering mechanism which is associated therewith, seen in the direction of arrow IV of FIG. 3.

The removal rack 10 occupies a fixed position in the direction of movement of the sheaths, indicated by arrow F in FIGS. 1 and 2. The laying rack 10 (FIGS. 3 and 4) is formed from parallel plates 14 intended to support the sheaths here and there, only one of which 16 is shown in FIG. 4, in retaining links 18 at the spacing pitch for removal by the handling machine. All the plates are identical. They are movable between a high position, in which they are shown in FIG. 1, and a low position in which they are situated below the level of the belts 20 of the transfer (unit 1) which will be described further on. The vertical movement of plates 14 between these two positions is controlled by a motor M1 (FIGS. 1 and 3). This motor drives a shaft 22 which comprises operating cams 24. Each of these cams 24 cooperates with a push rod 26 which slides in a guide tube 28 in a supporting frame and whose top end is fixed to the plate. Guiding of the plate by push rod 26 is provided by a vertical guide rod 30 sliding in the frame.

Unit 1 (lateral transfer unit) comprises a conveyor having belts inserted between plates 14 and having notches for receiving the sheaths spaced apart at the same pitch as the links 18 of the plates.

All these belts 20 are provided for being driven simultaneously by a motor M2. When lowering the previously loaded plates 14, the whole layer of sheaths is laid on the conveyor and bringing motor M2 into action causes continuous travel so as to completely free the sheaths by movement in the direction of arrow F, so that the laying station becomes free again.

Unit 2 is intended to provide a required change of pitch so as to present the sheaths one by one at the reading and weighing position. The space occupied by the device for providing this function is not compatible with the desired compact arrangement of the sheaths for transport by the handling machine. The pitch change unit 2 shown in FIGS. 1 and 2 is of the "pilgrim step" type. It comprises several assemblies each having two fixed bars 32 and a movable bar 34. The drive means of the mechanism driving the movable bars 34 is formed by a motor M3 which, through chains 36, drives the pulleys 38 keyed onto shafts 40. Each shaft has on its end two offcentered cranks 42 (FIG. 6) mounted in the bearings of two corresponding movable bars 34. It can be seen that each revolution of the crank causes a cyclic movement of the mobile bar. The mobile bars are placed with respect to unit 1 so that, during their rising and advancing movement, the mobile bars 34 take the nearest sheath placed on the transporter and advance it through a distance equal to the pitch p of notches provided in the fixed bars 32. Motor M2 is controlled by a presence detector so that the belt conveyor 20 effects an advance equal to a pitch, or to a multiple of pitches if the layer is incomplete, while unit 2 causes the sheath which has been taken to advance by a pitch p. This operation is repetitive so that, for each revolution of the offcentered crank 42, unit 2 takes hold of a new sheath while, simultaneously, the line of the preceding ones is transferred by a notch over the fixed bars 32.

One of the links of the fixed bars 32 (the fifth in FIG. 1) is replaced by a reading device for recording the reference carried by the sheath and for weighing. This device may comprise conventional optical elements and an electronic weighing means formed from currently available components so that it is not necessary to describe it here in detail.

Unit 3, for effecting a second change of pitch so as to bring this pitch back to a value equal to that of a machine presenting the pellets at the end of the vibrating table, is also of the "pilgrim step" type this unit also comprises bars 36 having an unchangable height and which, for this reason will be called "fixed" bars and mobile bars 48 having a cyclic movement also controlled by motor M3 which ensures absolute synchronism between the second and third units. But the control cranks for bars 48 are offcentered so that they keep a pitch different from that of the cranks controlling bars 34. The offcentering may for example be 10 mm instead of 20 mm, the link pitch of bars 46 being 20 mm instead of 40 mm.

Unit 4, supplying the vibrating table 50 with sheaths and removing the sheaths after filling, is combined with units 3 and 6. The fixed bars 46 of units 3 are in fact secured to bars 52 having the same link pitch placed downstream of bars 46 in the flow direction (arrow F). A drive mecahnism causes the assembly of fixed bars 46 and 52 to be moved longitudinally from the position shown with a continuous line in FIG. 1 to the position shown with a broken line after the actuating cylinders 82 have retracted the supports for the sheaths carried by the vibrating table. The amplitude of this movement is such that the sheaths carried by bars 46 come to a position in which they can be taken by a mechanism supplying the vibrating table 50 and the already filled sheaths, carried by bars 52, come to a discharge position. The number of links of bars 46 and 52 will be fixed by the number of sheaths which the vibrating table 50 may supply simultaneously. In FIG. 9, it has been supposed by way of example that the bars have 24 links.

The mechanism for moving bars 46–52 longitudinally may be of a very variable kind. The mechanism shown by way of example in FIG. 1 comprises an actuating cylinder V1 whose piston rod is hitched to a double loose pinion 54 which meshes with two fixed racks and two racks 56 secured to a carriage supporting bars 46 and 52. The actuating cylinder is provided with two end of travel switches 58 one corresponding to the position of the carriage shown in FIG. 1 with a continuous line and the other to the position shown with a broken line.

The purpose of unit 5, situated at the end of the vibrating table 50 but at the opposite end to the pellet feed, is to provide indexing, that is to say the accurate axial alignment of the sheaths and holding them in position before being taken over for holding in position at the right level by the devices belonging to the vibrating table and, subsequently, after filling with pellets, the reverse operation of freeing (de-indexing) the sheaths for removal thereof by unit 4.

The mobile assembly comprises a frame 60 having slides allowing it to slide along two shafts 61 parallel to the axis of the sheaths and supported by a base 62 itself movable along the same axis for accomodating two sheath lengths. An actuating cylinder V2 mounted between frame 60 and base 62 (FIG. 10) allows the frame to advance over shaft 61 from the position in which it is shown in FIG. 7. Frame 60 comprises spring loaded rods 64 (FIG. 8) in number equal to that of the sheaths and with the same spacing. It also comprises coaxial input rollers 66 having guide grooves with the same spacing as the sheaths. These grooves have dimensions such that they engage with the ends of sheaths 16 and hold them in position laterally. The stroke of actuating cylinder V2 is such that the advance of frame 60 under the action of this cylinder causes roads 64 to come into abutment in indexation noses 68 on the vibrating table 50, rods 64 to be driven into frame 60 and the springs of the rods to be compressed.

Frame 60 has a vertical cylinder V3 whose rod ends in a bar 70 for urging sheaths 16 against rollers 66 and holding them in position before being taken up by the holding devices associated with the vibrating table 50 and not shown.

The vibrating table is provided with means, formed by actuating cylinders 82 in FIG. 1, for bringing it to two levels designated by N1 and N2 in FIG. 8, corresponding respectively to indexing and filling with fuel pellets, and escaping downwardly under the level N0 for transfer by unit 4.

Unit 6, intended to give the sheaths a spacing such as to allow cleaning of the end of the sheath by passing a pad of cotton waste thereover, has a construction similar to that of unit 3. It comprises a set of mobile bars 72 actuated by a motor M4 by means of pulleys and chains.

Unit 7, similar in construction to unit 2, also comprises fixed bars 74 and mobile bars 76. These latter are also driven by motor M4, in synchronism with bars 72. Unit 7 allows cleaning and continuous transfer of the series of sheaths towards transporter 78, symmetrical with transporter 20 and actuated by a motor M5, and this at the same pitch as during laying.

Finally, transporter 78 which forms unit 8 cooperates with the take up rack 12, actuated by a motor M6.

The transfer assembly may be completed by means allowing it to accomodate several lengths of sheaths. In the case illustrated in FIG. 1, these complementary means comprise an actuating cylinder V5 which, before the weighing operation, realigns each sheath as it appears in front of the cylinder. These means also comprise a mechanism (not shown) for giving to the base 62 of frame 60 (FIG. 7) different positions depending on the length of the sheaths to be dealt with. As a general rule moreover the number of lengths to be treated will be small and will not exceed 2.

The transfer assembly is associated with automatic control means synchronized with the set of drive members, possibly formed by a programmable automatic device associated with a power cabinet. It is not necessary to describe here the construction and programming of the automatic device for they follow directly from the sequence of operations to be carried out, which will now be summed up.

A layer of sheaths closed at one end is placed on rack 10 at the moment when the sequence of operations begins. Rack 10 is then lowered by means of motor M1, which causes the sheaths to rest on the links of transporter 20. Motor M2 is actuated so as to remove transporter 20 over a length sufficient for completely freeing the sheaths from rack 10. This latter then becomes free and may be brought back to its original position, waiting for a new layer of sheaths. Motor M2 of transporter 20 and motor M3 actuated at the same time then come into play, with continuous operation, for causing the series of sheaths to be loaded onto unit 2, with a change of pitch. Whenever a sheath rests on the reading and weighing device 44, the reference carried by the sheath and its weight are recorded. With this unit 2, starting with a layer having a close pitch for reducing the space required during handling can be formed a layer with wide pitch leaving the room required for the reading and weighing device.

At the same time as unit 2, motor 3 actuates unit 3 so that the sheaths arriving at the end of unit 2 undergo a new change of pitch, which brings them into a compact position compatible with the pitch at which the vibrating table machine 50 simultaneously charges all the sheaths. After this change of pitch, the assembly of sheaths is located on the fixed bars 46. Actuation of cylinder V1 brings bars 46 above the vibrating table machine 50 and, simultaneously, brings the previously loaded sheaths above bars 72 of unit 6, for carrying out a new change of pitch. The means for raising the vibrating table, shown schematically in FIG. 1, by actuating cylinders 82, have beforehand freed the sheaths from the holding devices associated with the vibrating table 50. Raising of table 50 to level N2 then allows the indexing means to come into play and to drive the sheaths into the indexing nose 68, so as to ensure accurate positioning of the sheaths opposite the pellet supply passage ways. After positioning the vibrating table, placing a pellet loading plate, supplying with pellets by means of a tray and actuating the vibrating table and the pellet pushing mechanism, filling of the sheaths is finished. De-indexing is then effected by unit 5 after return of the vibrating table to level N1 and advance of frame 60 and combined action of cylinders V2 and V3. It is pointless to describe the succession of the operations, symmetrical with those effected upstream of the vibrating table loading machine. It is sufficient to note that cleaning of the end parts of the sheaths, for removing the fuel powder, is effected by means of cotton waste pads in the zone indicated at 6 in FIG. 1, during the continuous travel of the fixed bars 74.

We claim:

1. A device for transferring nuclear fuel element sheaths at a filling station, comprising:
    a first station for storage as a horizontal layer of a predetermined plurality of empty sheaths each having a closed end and an open end, said empty sheaths being in spaced relation to each other with a first predetermined mutual spacing;
    a second station for storage of a predetermined plurality of filled sheaths as a horizontal layer of said plurality of filled sheaths, said filled sheaths being in spaced relation to each other with said first predetermined mutual spacing;
    sheath-loading means located between said first and second stations on a transfer path of said sheaths along a predetermined direction and comprising filling means;
    first conveyor means for simultaneously engaging said plurality of empty sheaths and moving them as a whole toward said loading means;

first pitch change means associated with said first conveyor means for repeatedly bringing part of a plurality of empty sheaths to a loading location confronting said sheath-loading means, comprising a first unit for increasing the mutual spacing between adjacent sheaths to a second predetermined spacing and presenting the sheaths of said plurality successively one by one at a weighing station and a second unit for decreasing the spacing of the sheaths again to a third predetermined spacing smaller than said second predetermined spacing for presentation to a vibrating table machine of said sheath loading means, for simultaneous filling of said part of the plurality of said empty sheaths with said filling means;

second pitch change means for repeatedly removing said part of the plurality of sheaths after filling said empty sheaths from said loading location and returning said sheaths to said first predetermined mutual spacing;

second conveyor means associated with said second pitch change means for moving said plurality of sheaths from said second pitch change means to said second station, and control means for synchronized actuation of said conveyor means and pitch change means.

2. A device according to claim 1, wherein the second pitch change means comprise a unit for increasing the pitch for presentation to a cleaning station and a unit for bringing the sheaths onto said second conveyor means.

3. A device according to claim 1, wherein said pitch change means include pilgrim step conveyors.

4. A device for transferring nuclear fuel element sheaths at a filling station, comprising:
   a first station for storage as a horizontal layer of a predetermined plurality of empty sheaths each having a closed end and an open end, said empty sheaths being in spaced relation to each other with a predetermined first mutual spacing;
   a second station for storage of a predetermined plurality of filled sheaths as a horizontal layer of said plurality of filled sheaths said filled sheaths being in spaced relation to each other with said predetermined first mutual spacing;
   sheath-loading means located between said first and second stations on a transfer path of said sheaths along a predetermined direction and comprising filling means;
   first conveyor means for simultaneously engaging said plurality of empty sheaths and moving them as a whole toward said loading means ;
   first pitch change means associated with said first conveyor means for repeatedly bringing part of the plurality of empty sheaths to a loading location confronting said sheath-loading means with a second spacing which is different from said predetermined first mutual spacing, said first pitch change means comprising a first unit for increasing the second spacing between adjacent sheaths to a third spacing and presenting the sheaths of said plurality successively one by one at a work station and a second unit for decreasing the spacing of the sheaths again to the second spacing smaller than said third spacing for presentation to a vibrating table machine of said sheath-loading means, for simultaneous filling of said part of the plurality of said empty sheaths with said filling means;

movable means for indexing and de-indexing the sheaths on the vibrating table, comprising a support movable in the longitudinal direction with respect to said sheath between a position in which it is moved away from the closed end of the sheaths and a position in which individual spring loaded rods carried by the support each apply a sheath against an indexing nose on the vibrating table;

second pitch change means for repeatedly removing said part of the plurality of sheaths after filling said empty sheaths from said loading location and returning said sheaths to said predetermined first mutual spacing;

second conveyor means associated with said second pitch change means for moving said plurality of sheaths from said second pitch change means to said second station, and control means for synchronized actuation of said conveyor means and pitch change means.

5. A device according to claim 1, wherein the support also has means for holding the sheaths in place allowing to free the sheaths from the indexing noses by retraction of the support.

6. A device for transferring nuclear fuel element sheaths at a filling station, comprising:
   a first station for storage as a horizontal layer of a predetermined plurality of empty sheaths each having a closed end and an open end, said empty sheaths being in spaced relation to each other with a predetermined first mutual spacing;
   a second station for storage of a predetermined plurality of filled sheaths as a horizontal layer of said plurality of filled sheaths, said filled sheaths being in spaced realation to each other with said predetermined first mutual spacing:
   sheath-loading means located between said first and second stations on a transfer path of said sheaths along a predetermined direction and comprising filling means;
   first conveyor means for simultaneously engaging said plurality of empty sheaths and moving them as a whole toward said filling station, said conveyor means cmprising a pilgrim step transporter having movable support bars cyclically driven for causing the sheaths to advance and a first set of fixed bars movable between a position for receiving the sheaths brought by the movable support bars and a position for presenting said sheaths to first pitch change means;
   first pitch change means associated with said first conveyor means for repeatedly bringing part of the plurality of empty sheaths to a loading location with a second spacing which is different from said predetermined first mutual spacing, for simultaneous filling of said part of the plurality of said empty sheaths with said filling means;
   a second pitch change means for repeatedly removing said part of the plurality of sheaths after filling said empty sheaths from said loading location and returning said sheaths to said predetermined first mutual spacing, comprising a second set of fixed bar fast with the first set of fixed bars of said first conveyor means, the movement of all sets of fixed bars so as to bring a set of empty sheaths in alignment with the sheath-loading means also causing movement of filled sheaths carried by the second set of fixed bars from a position facing the sheath-loading means to a position where they are taken by the second pitch change means;

means for raising the sheaths from said second set of fixed bars to a predetermined level of said sheath-loading means so as to free the sheaths from said second set and for lowering the sheaths from said predetermined level to the fixed bars movable for presenting sheaths to said sheath-loading means so as to lay said sheaths on said fixed bars;

second conveyor means associated with said second pitch change means for moving said plurality of sheaths from said second pitch change means to said second station, and control means for synchronized actuation of said conveyor means and pitch change means.

* * * * *